United States Patent Office 3,107,245
Patented Oct. 15, 1963

3,107,245
PROCESS FOR THE PREPARATION OF
PHOSPHORIC ACID ESTERS
John A. Gaunt, McIntosh, and Joseph W. Stutts, Jackson,
Ala., assignors to Geigy Chemical Corporation, Greenburgh, N.Y., a corporation of Delaware
No Drawing. Filed Aug. 28, 1961, Ser. No. 134,093
8 Claims. (Cl. 260—251)

This invention relates to an improved process of preparing esters of phosphoric acid, and more specifically to phosphoric esters of substituted hydroxypyrimidines and substituted phenols.

In one particular aspect, the present invention pertains to the manufacture of esters of dialkoxy phosphoric acids of the following general formula:

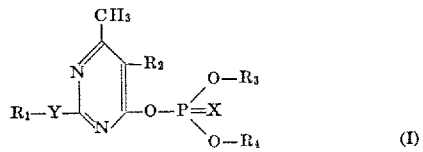

(I)

wherein $R_1$ represents alkyl, alkenyl, alkoxyalkyl or alkylmercaptoalkyl radicals, $R_2$ stands for hydrogen, lower alkyl or lower alkenyl radicals, $R_3$ and $R_4$ are lower alkyl radicals, X represents oxygen or sulfur and Y consists of the direct link or sulfur.

These compounds which are disclosed and claimed in U.S. Patent 2,754,243, and particularly the dialkoxy thiophosphates, as for example, O,O-diethyl-O-(2-isopropyl-4-methyl-6-pyrimidyl)thiophosphate, are of great commercial value by virtue of their well-established insecticidal and acaricidal activity and consequent usefulness in pest control.

The compounds of the above formula have heretofore bene produced by reacting an aliphatic phosphoric acid diester halide or a thiophosphoric acid diester halide of the formula

(II)

wherein Hal represents chlorine or bromine and X, $R_3$ and $R_4$ are as defined hereinabove, with a hydroxyprimidine of the formula

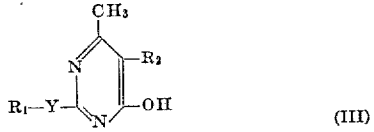

(III)

wherein $R_1$, $R_2$ and Y have the significance given to them above, in the presence of benzene as solvent and potassium carbonate as acid binding agent.

However, the practice of this process entailed certain drawbacks and disadvantages. Thus, for example, it was not possible to use as acid binding agent, in lieu of potash, soda ash which is appreciably less expensive, i.e. only 15–25% of the cost of potash, inasmuch as with soda ash yields of less than 20% are obtainable even if the reaction time is in excess of 24 hours. But even with potash being used, the total reaction time was too long from the point of view of commercial feasibility, e.g., in excess of 16 hours.

It htas now been found and forms the principal object of this invention, that dialkoxy thiophosphates of Formula I of great purity and in high yields may be advantageously produced in a considerable shortened period of time by means of a procedure which utilizes as catalysts mercury salts. Especially with mercury chlorides, the reaction time can be reduced to as little as 3–6 hours. This procedure is singularly adapted to large scale manufacturing at greatly reduced costs.

In this improved process a hydroxypyrimidine of the Formula III and sodium carbonate are refluxed in benzene for about 2 to 3 hours to remove water azeotropically. Then the suspension is cooled to about 70° C. and the desired dialkyl phosphoric or, preferably, thiophosphoric acid halide of the Formula II, in a substantially equimolar amount to that of the hydroxypyrimidine of Formula III, is added thereto together with a catalytic amount of a mercury salt, and the mixture is refluxed for approximately three to six hours. In the product work-up, the material is washed and the benzene is removed by vacuum distillation.

The final products obtained according to the inventive process are exceptionally good in color.

The mercury salts which can be employed in the practice of this process are mercury chlorides and iodides and, more particularly, the mercurous as well as the mercuric chlorides and iodides. Especially preferred, however, is the mercurous chloride and the procedure utilizing catalytic amounts thereof constitutes the preferred embodiment. It has been found that it is practicable to employ amounts ranging from 0.001 to 0.1 mole of catalyst per mole of O,O-dialkyl thiophosphoric acid chloride. Although it is possible to use amounts beyound this range, a decrease in quantity of catalyst below the indicated minimum results in an increase in reaction time and decrease in yield; an increase in amount of catalyst above the indicated maximum has no adverse effects, it is true, but yields no advantage. A more preferred range, however, is 0.01 to 0.04 mole of catalyst per mole of the acid chloride.

It is possible to use in this inventive process instead of benzene as inert solvent also such other diluents or slurrying agents as toluene, xylene, chlorobenzene, and similar aromatic hydrocarbons. However, this list of usuable solvents is not exclusive. It has been found that aliphatic hydrocarbons, both cyclic nad non-cyclic, can also be employed. In fact, any solvent or inert diluent can be used in the practice of this process as long as it forms an azeotrope with water so that the water formed during the reaction can be removed. Also mixtures of any of the thus practicable solvents can be employed. For instance, Tolusol (trademark of Shell), which consists of 31% of paraffins, 55% of naphthenes, 13% of aromatics and 1% of olefins, has been successfully used.

In lieu of soda ash, which is the preferred anhydrous acid binding agent, other materials such as potassium carbonate, calcium carbonate, sodium hydroxide and their equivalents may be employed.

It has further been found and forms another object and aspect of this invention that the inventive process as described herein can be employed not only for the preparation of compounds of Formula I, but also in an analogous manner of compounds of the following formula:

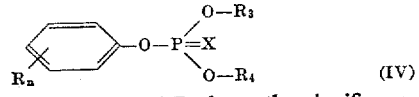

(IV)

wherein the symbols X, $R_3$ and $R_4$ have the significance ascribed to them hereinabove, R denotes lower alkyl, particularly, methyl and ethyl; halogen, particularly, chlorine and bromine; nitro and methylmercapto, and $n$ is an integer of from 1 to 3. Compounds embraced by Formula IV are likewise well-known pesticides, as for example, O,O-diethyl - O - p-nitrophenyl thiophosphate, O,O-dimethyl - O - p-nitrophenyl thiophosphate, O,O-dimethyl-O-(3-chloro - 4 - nitrophenyl)thiophosphate, O,O-dimethyl - O - (2 - chloro-4-nitrophenyl)thiophosphate, O,O - dimethyl - O-2,4,5 - trichlorophenyl thiophosphate, O,O-diethyl-O-p-nitrophenyl phosphate, etc.

Furthermore, it will be readily appreciated by men skilled in the art that the scope of applicability of the inventive process is much wider than circumscribed herein. Thus, it is at once apparent that in accordance with this invention O,O-dialkyl-O-aryl phosphates and thiophosphates in general can be prepared, it being understood that the meaning of "aryl" includes heterocyclic moieties as well.

The invention may be illustrated in greater detail by the following examples; it is, however, not limited thereto.

Example 1

2-isopropyl-4-methyl - 6 - hydroxypyrimidine (233 g., 1.47 mole) and 163 g. sodium carbonate (1.38 moles, finely divided light grade, rather than coarse laboratory grade) were charged together with 460 g. of benzene into a two liter, round bottom, three-neck flask equipped with a heating mantle, agitator, thermometer and a water cooled reflux condenser fitted with a Barrett-type water trap. This mixture was refluxed for two hours to azeotropically remove water in the Barrett separator. Then the suspension was cooled to 70° C. and 4.65 g. (0.02 mole) of mercurous chloride as well as 247 g. (1.31 mole) of O,O-diethyl chlorothiophosphate was added and the whole reaction mixture refluxed for three hours at atmospheric pressure. The solution was then cooled, washed with water, twice with 3% sodium hydroxide and with 5% sulfuric acid and again twice with water, and the benzene was removed by vacuum distillation so that the temperature did not exceed 95° C. Benzene was then added to make the total weight 450 g. The desired reaction product, O,O-diethyl-O-(2-isopropyl-4-methyl-6-pyrimidyl)thiophosphate, was then analyzed by the "sulfuric acid extraction method" (i.e., the procedure set forth in "Specifications for Pesticides," World Health Organization, 1956, p. 85, but modified in that the first extraction with distilled water is carried out with one portion of 50 ml. of distilled water and is preceded by extraction with three portions of 50 ml. 3 N sulfuric acid). Yield: 379 g. (90.2% of theory).

Example 2

Example 1 was repeated except that 0.026 mole of mercuric chloride replaced the mercurous chloride and the reaction time was increased from 3 to 5 hours. Yield: 79.0% of theory.

Example 3

2-isopropyl-4-methyl - 6 - hydroxypyrimidine (233 g., 1.47 moles) and 163 g. (1.38 moles) of sodium carbonate were charged together with 460 g. of benzene to a flask as described in Example 1. This reaction mixture was then heated to reflux until no more water was removed (3 hours). After cooling to 71° C., 6.18 g. (0.0262 mole) of mercurous chloride as well as 247 g. (1.31 mole) of O,O-diethyl chlorothiophosphate were added and the mixture was again heated to reflux for a period of 6 hours. It was then cooled and washed successively with (a) 150 ml. of benzene and 520 ml. of water, (b) twice with 460 ml. of sodium hydroxide, (c) with 391 g. of 5% sulfuric acid and again twice with water. The reaction product was then dried and the benzene removed by heating to 90° C. at 75 mm./Hg. The product, O,O-diethyl-O-(2-isopropyl - 4 - methyl-6-pyrimidyl)- thiophosphate, was checked for chloride content and assayed by the "sulfuric acid extraction method." Yield: 386 g. (91.9%).

Example 4

The procedure described in Example 3 was followed employing, however, 8.57 g. (0.0262 mole) of mercurous iodide as catalyst. Reflux time after addition of the chlorothiophosphate and catalyst was 14 hours. Yield of the desired product was 360 g. (69.3%).

Example 5

Again using the same equipment, reactants and procedure as in Example 3, 11.9 g. (0.0262 mole) of mercuric iodide was added as catalyst. After reflux of 14 hours, 317 g. of the desired product with a yield of 83.0% were obtained.

Example 6

Using the same equipment and procedure as described hereinabove, 69.5 g. (0.50 mole) of p-nitrophenol, 46 g. (0.288 mole) of sodium carbonate, 640 ml. of toluene, 2.36 g. (0.010 mole) of mercurous chloride and 94 g. (0.50 mole) of O,O-diethyl chlorothiophosphate were employed. The reflux time after addition of the chlorothiophosphate and catalyst was 4 hours. O,O-diethyl-O-p-nitrophenyl thiophosphate (138 g., 84.5% yield) was obtained.

What is claimed is:

1. In a process for the production of O,O-dialkyl-O-aryl phosphates and thiophosphates by reacting a dialkyl phosphoric acid halide of the formula

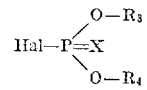

wherein Hal is selected from the group consisting of chlorine and bromine, X is taken from the group consisting of oxygen and sulfur, and $R_3$ and $R_4$ are lower alkyl, with a material selected from the group consisting of compounds of the formulae

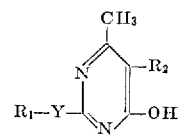

and

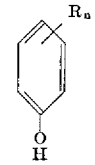

wherein R is a member of the group consisting of lower alkyl, halogen, nitro and methylmercapto, $R_1$ is selected from the group consisting of alkyl, alkenyl, alkoxyalkyl and alkylmercaptoalkyl, $R_2$ is taken from the group consisting of hydrogen, lower alkyl and lower alkenyl, Y is selected from the group consisting of sulfur and the direct link and $n$ is an integer of from 1 to 3, in a hydrocarbon diluent and in the presence of an acid binding agent, the improvement which consists in refluxing said reactants in the presence of a catalyst selected from the group consisting of mercury chlorides and iodides.

2. A process according to claim 1, wherein the catalyst is selected from the group consisting of mercurous and mercuric chloride and mercurous and mercuric iodide and is present in the ratio of 0.001 to 0.1 mole per mole of dialkyl phosphoric acid halide.

3. A process according to claim 2, wherein the catalyst is selected from the group consisting of mercurous and mercuric chloride and is present in the ratio of 0.01 to 0.04 mole per mole of dialkyl phosphoric acid halide.

4. In a process for the production of O,O-dialkyl-O-aryl phosphates and thiophosphates by reacting a dialkyl phosphoric acid halide of the formula

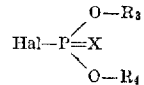

wherein Hal is selected from the group consisting of chlorine and bromine, X is taken from the group consisting of oxygen and sulfur, and $R_3$ and $R_4$ are lower alkyl, with a hydroxypyrimidine of the formula

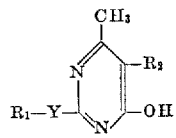

wherein $R_1$ is selected from the group consisting of alkyl, alkenyl, alkoxyalkyl and alkylmercaptoalkyl, $R_2$ is a member of the group consisting of hydrogen, lower alkyl and lower alkenyl, and Y is taken from the group consisting of sulfur and the direct link, in a hydrocarbon diluent and in the presence of an acid binding agent, the improvement which consists in refluxing said reactants in the presence of a catalyst selected from the group consisting of mercurous and mercuric chloride and mercurous and mercuric iodide, the catalyst being present in the ratio of 0.001 to 0.1 mole per mole of dialkyl phosphoric acid halide.

5. In a process for preparing O,O-diethyl-O-(2-isopropyl-4-methyl-6-pyrimidyl)thiophosphate of high yield and purity by reacting substantially equimolar quantities of 2-isopropyl-4-methly-6-hydroxypyrimidine and O,O-diethyl chlorothiophosphate, suspended in a hydrocarbon diluent and in the presence of an anhydrous acid binding agent, the improvement which consists in refluxing said reactants in the presence of a catalyst selected from the group consisting of mercurous and mercuric chloride, the catalyst being present in the ratio of 0.01 to 0.04 mole per mole of O,O-dialkyl chlorothiophosphate.

6. In a process for the production of O,O-dialkyl-O-aryl phosphates and thiophosphates by reacting a dialkyl phosphoric acid halide of the formula

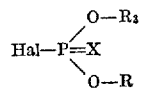

wherein Hal is selected from the group consisting of chlorine and bromine, X is taken from the group consisting of oxygen and sulfur, and $R_3$ and $R_4$ are selected from the group consisting of lower alkyl, with a phenolic compound of the formula

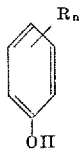

wherein R is selected from the group consisting of lower alkyl, halogen, nitro and methylmercapto, and $n$ is an integer of from 1 to 3, in a hydrocarbon diluent and in the presence of an acid binding agent, the improvement which consists in refluxing said reactants in the presence of a catalyst selected from the group consisting of mercurous and mercuric chloride and mercurous and mercuric iodide, the catalyst being present in the ratio of 0.001 to 0.1 mole per mole of dialkyl phosphoric acid halide.

7. In a process for preparing O,O-diethyl-O-p-nitrophenyl thiophosphate by reacting substantially equimolar quantities of p-nitrophenol and O,O-diethyl chlorothiophosphate, suspended in an aromatic hydrocarbon diluent and in the presence of an anhydrous acid binding agent, the improvement which consists in refluxing said reactants in the presence of a catalyst selected from the group consisting of mercurous and mercuric chloride, the catalyst being present in the ratio of 0.01 to 0.04 mole per mole of O,O-diethyl chlorothiophosphate.

8. A process for preparing O,O-diethyl-O-(2-isopropyl-4-methyl-6-pyrimidyl)thiophosphate of high yield and purity which comprises reacting substantially equimolar quantities of 2-isopropyl-4-methyl-6-hydroxylpyrimidine and O,O-diethyl chlorothiophosphate, suspended in an inert diluent adapted to form an azeotrope with water and in the presence of an anhydrous acid binding agent and a catalyst selected from the group consisting of mercurous and mercuric chloride, the catalyst being present in the ratio of 0.01 to 0.04 mole per mole of O,O-diethyl chlorothiophosphate.

References Cited in the file of this patent

UNITED STATES PATENTS

| | | |
|---|---|---|
| 2,121,611 | Salzberg | June 21, 1938 |
| 2,815,350 | Speck | Dec. 3, 1957 |

FOREIGN PATENTS

| | | |
|---|---|---|
| 713,278 | Great Britain | Aug. 11, 1958 |

UNITED STATES PATENT OFFICE
CERTIFICATE OF CORRECTION

Patent No. 3,107,245            October 15, 1963

John A. Gaunt et al.

It is hereby certified that error appears in the above numbered patent requiring correction and that the said Letters Patent should read as corrected below.

Column 1, line 46, for "hydroxyprimi-" read
-- hydroxypyrimi- --; line 67, for "htas" read -- has --;
column 2, lines 27 and 28, for "beyound" read -- beyond --;
line 38, for "usuable" read -- usable --; column 5, lines 39
to 43, the formula should appear as shown below instead of as
in the patent:

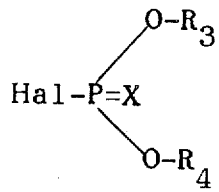

Signed and sealed this 12th day of May 1964.

(SEAL)
Attest:

ERNEST W. SWIDER            EDWARD J. BRENNER

Attesting Officer            Commissioner of Patents